United States Patent
Xu et al.

(10) Patent No.: US 10,552,268 B1
(45) Date of Patent: Feb. 4, 2020

(54) BROKEN POINT CONTINUOUS BACKUP IN VIRTUAL DATACENTER

(71) Applicant: EMC IP Holding Company LLC, Hopkinton, MA (US)

(72) Inventors: Dening Xu, Chengdu (CN); Shahid Paloth Parambil, Kerala (IN); Mohammed Abdul Samad, Karnataka (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

(21) Appl. No.: 16/153,502

(22) Filed: Oct. 5, 2018

(51) Int. Cl.
*G06F 11/14* (2006.01)
*G06F 9/455* (2018.01)
*G06F 21/44* (2013.01)

(52) U.S. Cl.
CPC ...... *G06F 11/1464* (2013.01); *G06F 9/45558* (2013.01); *G06F 11/1466* (2013.01); *G06F 21/44* (2013.01); *G06F 2201/815* (2013.01); *G06F 2201/84* (2013.01)

(58) Field of Classification Search
CPC .. G06F 11/1446–1469; G06F 9/45533–45558; G06F 2009/45562–45595
See application file for complete search history.

(56) References Cited

U.S. PATENT DOCUMENTS

| 9,535,803 | B2* | 1/2017 | Kaplan | G06F 11/2007 |
| 9,727,429 | B1* | 8/2017 | Moore | G06F 11/203 |
| 10,228,962 | B2* | 3/2019 | Dornemann | G06F 9/45558 |
| 10,334,074 | B2* | 6/2019 | Hoeg | H04L 41/08 |

* cited by examiner

*Primary Examiner* — Nicholas J Simonetti
(74) *Attorney, Agent, or Firm* — Womble Bond Dickinson (US) LLP

(57) ABSTRACT

Providing backup of virtual machines can be performed by a backup server. The backup server can maintain log-in credentials for a central management server and a virtual machine host. If communication is lost between the backup server and the central management server, the backup server can initialize a connection directly to the host and back up a target virtual machine.

20 Claims, 8 Drawing Sheets

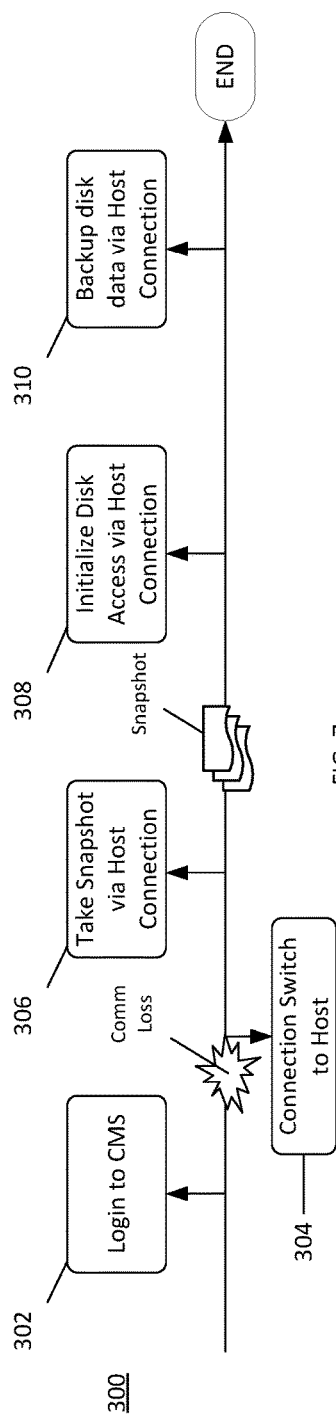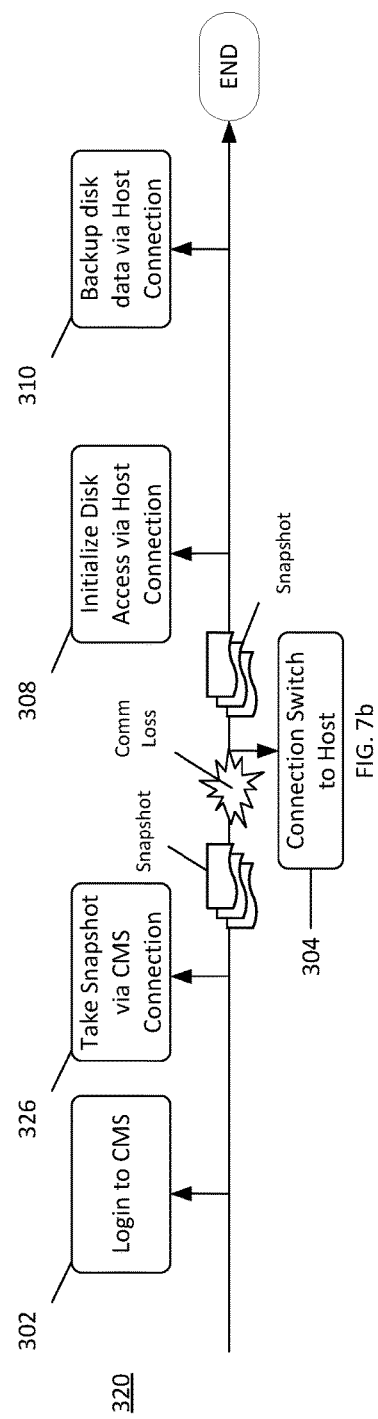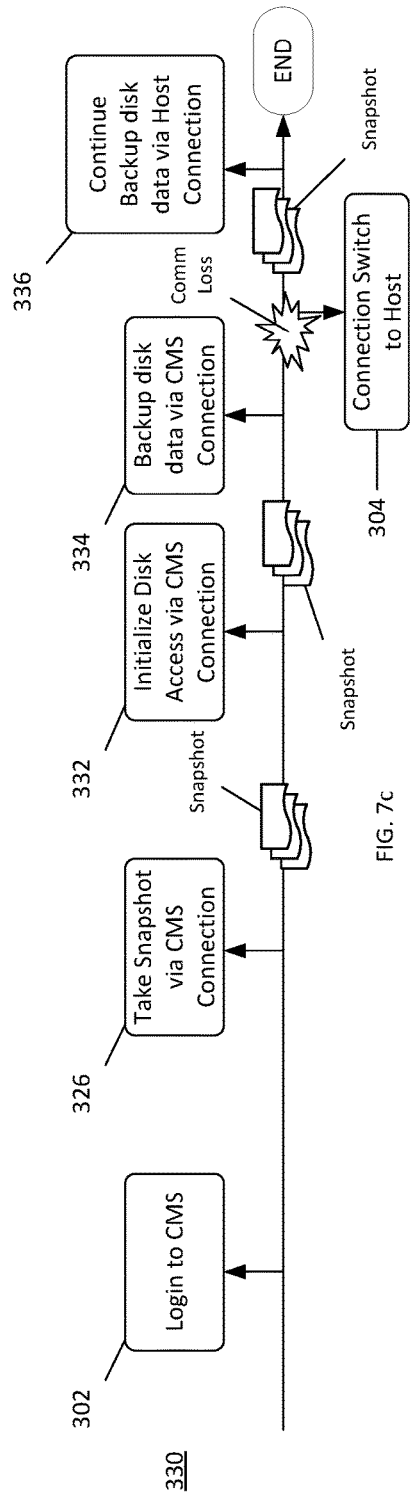

BROKEN POINT CONTINUOUS BACKUP IN VIRTUAL DATACENTER

FIELD OF THE INVENTION

Embodiments of the present invention relate generally to data storage systems. More particularly, embodiments of the invention relate to virtual machine (VM) image backup.

BACKGROUND

Organizations are increasingly deploying applications on virtual machines (VMs) to improve Information Technology (IT) efficiency and application availability. A key benefit of adopting virtual machines is that they can be hosted on a smaller number of physical servers (VM servers). Different types of VM backup and recovery options exist.

Backup solutions exist in VM environments. An environment can include a host server that has one or more VMs and a VM manager or hypervisor to create and manage VMs. Management tasks include creating snapshots of VMs. A hypervisor is computer software, firmware or hardware that creates and runs virtual machines. The term hypervisor shall be interchangeable with virtual machine monitor (VMM). A computer on which a hypervisor runs one or more virtual machines is called a host machine, and each virtual machine is called a guest machine. The hypervisor presents the operating systems of VMs (guest operating systems) with a virtual operating platform and manages the execution of the guest operating systems.

A hypervisor can take snapshots of each VM to use as restore points. Thus, a user can revert back to, or restore, a previous state of a VM by using the snapshot. A snapshot of a VM can include the power state (on, off, suspended), data (virtual disks, memory) and hardware configuration (virtual network interface cards) of the VM at the time the snapshot was generated. Thus, snapshots can be leveraged by backup systems to back up a VM by storing the data, configuration and power state that was generated by the snapshot onto a disk. In this manner, if a host or disk or memory fails in relation to the VM, a backup of the VM exists, and important files and applications can be salvaged.

A VM environment often includes a centralized management server (CMS) that can serve as an access and management point for multiple VM hosts. Beneficially, a single CMS can manage many VM hosts, and the many VMs on each host, thereby increasing the management efficiency and controllability of many VMs. In such an environment, a backup server communicates with the CMS to coordinate a backup of a target VM. 'Backup server' and 'backup application server' shall be used interchangeably herein.

In some situations, the communication between the CMS and backup server is lost. For example, communication loss can occur from a disconnection or poor connection, a timeout, an interruption, a CMS failure, or a power failure. In such a case, the backups will fail because communication to the VMs, through the CMS, is lost.

Without backups, a customer's data protection can be jeopardized. Backup service plans to customers can have a defined recovery point objective (RPO) and recovery time objective (RTO).

RPO is a metric that indicates an amount of data that may be at risk of being lost. This can be determined by the amount of time between data protection events (such as snapshots and/or backups) and reflects the amount of data that potentially could be lost due, due to a failure.

RTO is a metric that relates to downtime. The metric includes an amount of time to recover from a data loss event, and how long it takes to return to service. For example, the RTO can refer to the amount of time a user's VM is unavailable or inaccessible or inoperative.

In the case that communication between a backup server and a CSM is lost; a failed backup can create service delays. A user may have to wait until the communication is resumed to perform a backup, and then wait again for the backup to complete. Furthermore, the backup window may be missed, in the case of periodic scheduled backups. Thus, this can impact the RPO and RTO metric of a VM service.

Furthermore, if the communication between the backup server and the CMS is not resumed, then all subsequent backups may fail, which can have a grave impact on the RPO. Thus, it is beneficial to provide a solution even if communication between a backup server and a CMS is lost.

BRIEF DESCRIPTION OF THE DRAWINGS

Embodiments of the invention are illustrated by way of example and not limitation in the figures of the accompanying drawings in which like references indicate similar elements.

FIGS. 7a-7c show timelines illustrating processes to perform backups under communication loss scenarios.

DETAILED DESCRIPTION

Figure 1:
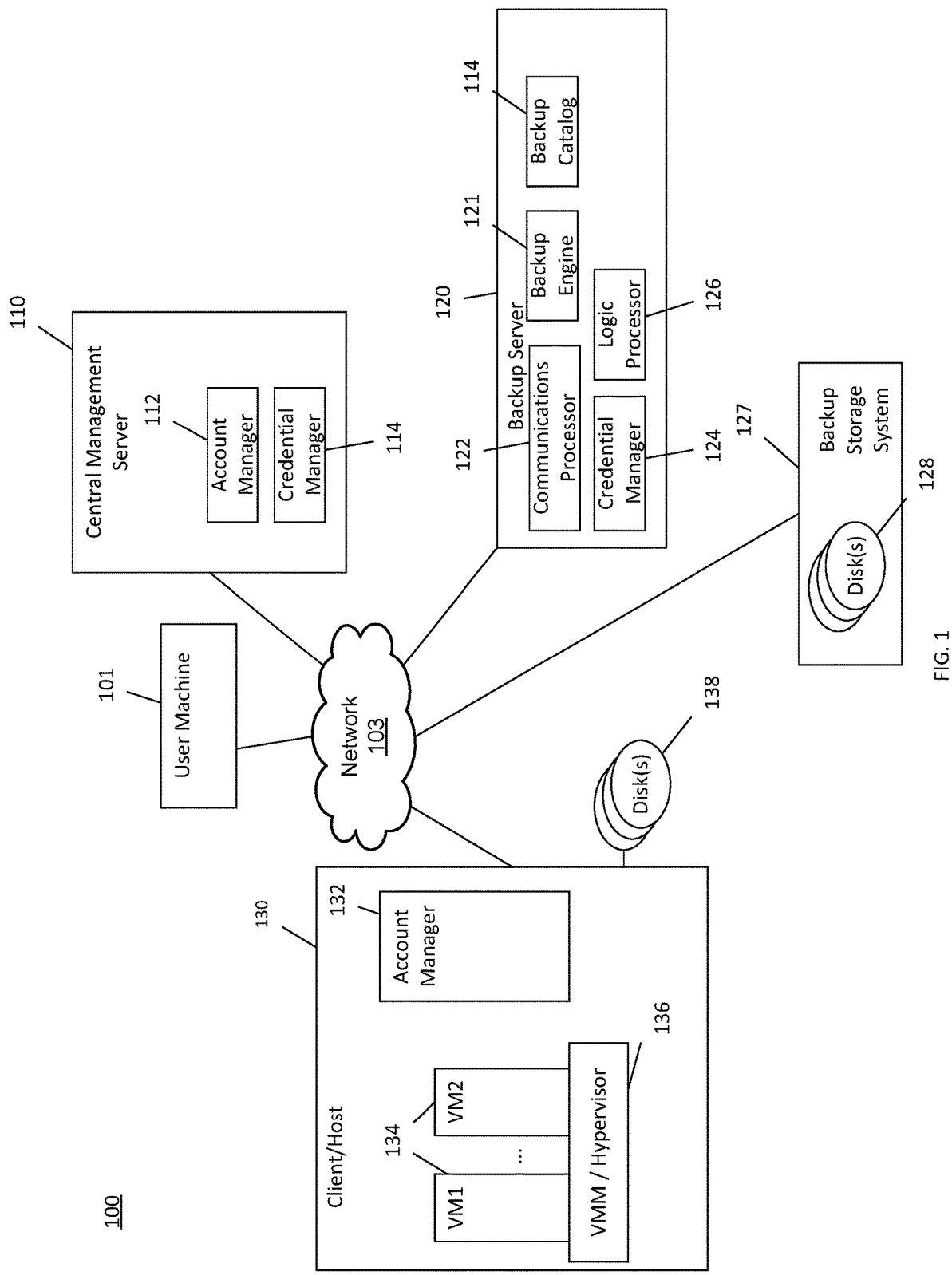
FIG. 1 is a block diagram illustrating a virtual environment with backup server according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a host can be a computer server that has a hypervisor that runs one or more guest virtual machines (VMs). The hypervisor can provide a virtual operating platform to each of the VM operating systems. The host has a storage system associated with it to store data and an application programming interface (API) via which the VMs are managed. An example of VM API is VMware's vStorage APIs for Data Protection (VADP). A request for backing up a VM is sent from a backup application to the host. The VMM, in response to a request to back up a VM to a backup storage system, establishes a consistent state of the VM and generates a snapshot of the VM, also described herein as a "restore point". The VMM identifies one or more files within the snapshot that satisfy a predetermined criterion. If the one or more files is identified, the VMM dynamically backs up a modified representation of the snapshot (e.g., the snapshot excluding one or more files within the snapshot in substitution with a predetermined data pattern) by analyzing the snapshot to determine start and end addresses of the identified one or more files within the snapshot and substituting content of the identified one or more files at the determined addresses with a predetermined data pattern. In one embodiment, a backup solution (for example, Avamar) includes a server that processes the backup data generated by the snapshot by deduplicating duplicate data segments or trunks (e.g., 64 KB). For the substituted one or more files with predetermined data pattern (e.g., repeated 64 KB data trunks), only one copy of the data trunk (e.g., 64 KB) will be sent to the target backup storage system, only once. The removed duplicates will reference the only copy. Therefore, transmitting the substituted one or more files with predetermined data pattern reduces the overall transmission bandwidth and overall server storage capacity.

In one embodiment, the backup server can be configured to use VM API or Vsphere API or a first protocol to request that the VMM generates a snapshot of a target VM and/or deletes the snapshot after the backup process completes or terminates, which causes the snapshot to be deleted from a storage system. In one embodiment, backing up the modified representation of the snapshot includes parsing the modified representation of the snapshot at a storage system to populate a file catalog. In another embodiment, the modified representation of the snapshot is reconstructed from the deduplicated modified representation of the snapshot to parse the modified representation of the snapshot at the target backup storage system to populate a file catalog. Metadata in the snapshot are interpreted to determine information about the files contained in the snapshot. Such information includes file attributes such as file name, access control information, and information about layout of the file within the disk snapshots. Such information is then used to populate a backup catalog of the files in the backed up VM.

In one embodiment, the request for backing up a VM is sent from a backup application of the storage system associated with the clients. In another embodiment, the request for backing up a VM is sent from a backup application server. In another embodiment, the request for backing up a VM is sent from a central management server (CMS) that manages multiple clients over a network, each client containing one or more VMs and each client has access to storage system. In one embodiment, the CMS server can be a part of the backup application server. In another embodiment, the request for backing up a VM is sent from a backup application of the target backup storage system.

In one embodiment, a method is performed by a computing device, for example, a backup server. The method includes maintaining log-in credentials for a virtual machine central management server (CMS), the CMS providing an interface to manage one or more VM hosts, and maintaining log-in credentials for a VM host having stored therein a target VM. If communication is lost with the CMS, the method includes initializing a connection to the VM host, backing up the target VM by accessing virtual disk data relating to the target VM, and storing the virtual disk data to a physical disk as a backup of the target VM, the physical disk being independent from the VM host.

In one embodiment, a computing device, for example, a backup server is configured to perform a backup of one or more target VMs through a CMS and/or through a host. The computing device first attempts to perform a backup (including a snapshot and then a disk access) with a CMS. If, at any point of the backup sequence, the communication with the CMS is lost, the backup server is configured to switch connections to the host, and continue the backup sequence directly though the host.

Referring now to FIG. 1, a backup solution or backup system 100 is shown according to one embodiment. A host 130 can have a hypervisor or VMM 136 that creates and runs guest VMs 134. The host can have an account manager 132 that manages access to the host. For example, in order to interface with the host to perform operations such as snapshots or access memory/disks, the account manager may require from a requester certain credentials (for example, a key pair or username and password). The hypervisor of the host can perform snapshots of the VMs and store the snapshots in memory, for example, disks 138. Such disks can be virtualized hard disks of corresponding VMs stored on actual disk storage devices. They can be integral to the host 130 or separate and accessed through the network.

A central management server 110 can communicate with several hosts such as host 130, thereby providing a centralized point that can manage multiple hosts and the VMs on each host. The CMS can have an account manager 112 that manages which users can log into the CMS and which users can log into different hosts. The CMS can also have a credential manager 114 that is used to access the different hosts that the CMS is in communication with, for example, over the network 103.

A user, for example, an administrator, on a user machine 101 can perform administrative actions on the guest VMs in a host by logging into the CMS or a backup server 120.

A backup server 120 can communicate with a CMS to schedule backups of target VMs. A user can manage backups performed by a backup server either through direct commands or by scheduling periodic backups of VMs. The backup server 120 can have a communications processor 122 to communicate with a central management server 110, for example, over a network 103. Network communications can include TCP/IP or other equivalent protocols and be wired or wireless.

The backup server 120 can perform a backup of a target VM by communicating with the host through the CMS. The backup server can communicate commands to the CMS with CMS credentials stored and managed by a credential manager 124. The backup server can then request that a snapshot be taken of a target VM on a host.

In one aspect, after a snapshot of a VM is taken, the backup server can access disk data (e.g. file data, application data, state information, and configuration data) of the snapshot, and store the data to a backup storage system 127 having disks 128. It should be understood that 'disk data' can include 'virtual disk data', 'virtual hard disk data', 'physical drives' and combinations thereof. Similarly, 'virtual disk data' can include 'virtual hard disk data' or any data relating to the virtual machines that can be used to manage or recreate a VM image. Thus, the disks 138 and 128 can be one or more virtualized hard disks or data relating thereto, residing on or one or more hard disks that can be integral to the host or accessible through the network 193. Beneficially, the disks 128 can be separate from the disks 138, which provides for redundancy and backup protection in the case where a failure happens with the host 130 and/or the disks 138.

The credential manager 124 can also manage host credentials to access the host 130 directly. This can be advantageous because the credentials required to access the CMS are typically different than those required to access each host, for security reasons. If communication is lost between the backup server 110 and the CMS, the backup server can still back up guest VMs 134 by communicating directly with the host with the host credentials. It should be noted that the credential manager 124 can store credentials in memory, or it can access them remotely through the network 103 at, for example, a different server on the network.

The backup server can initialize disk access and data transfers through the CMS or through the host via calls based on a second protocol, API, or software library. Such a protocol or API or library, for example, VDDK for vSphere, defines virtual disk actions and calls within the virtual environment.

The host can be a server, a personal computer (e.g., desktops, laptops, and tablets), a "thin" client, a personal digital assistant (PDA), a Web enabled appliance, or a mobile phone (e.g., Smartphone), etc. Alternatively, any of hosts 130 may be a primary storage system (e.g., local data center) that provides storage to other local clients, which may periodically back up the content stored therein to a backup storage system (e.g., a disaster recovery site or system).

Network 103 may be any type of networks such as a local area network (LAN), a wide area network (WAN) such as the Internet, a fiber network, a storage network, or a combination thereof, wired or wireless.

Backup storage system 127 may include or represent any type of servers or a cluster of one or more servers (e.g., cloud servers). For example, backup storage system 127 may be a storage server used for various different purposes, such as to provide multiple users or client systems with access to shared data and/or to back up (or restore) data (e.g., mission critical data). Backup storage system 127 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Backup storage system 120 may further provide storage services via an object-based protocol and Hadoop distributed file system (HDFS) protocol. In one embodiment, the backup server 120 coordinates with backup storage system 127, and client(s) 130 to run various backup operations, for example, through the CMS 110 or directly with the host(s) 130.

In one embodiment, CMS 110 manages VM configuration information of client/host 130. A CMS may manage VM configuration information of multiple hosts, and each host contains one or more VMs managed by a VMM running therein. A CMS may be communicatively coupled with hosts, backup application server, and backup storage systems. CMS 110 may obtain VM information through various ways. For example, CMS may remotely synchronize with host VMMs within the network, or VMMs may update CMS whenever status change happens with VMs. In this example, the CMS is communicatively coupled with backup application server 120 and one or more hosts 130.

Backup or restore points of a VMs 134 can be saved onto a backup VM disk file(s) 128 of backup storage system 127. In one embodiment, CMS 110 and backup application server 120 may be integrated as a single system. In one embodiment, backup server 120 and backup storage system 127 can be integrated as a single system.

Backup storage unit 127 may be implemented locally (e.g., single node operating environment) or remotely (e.g., multi-node operating environment). It may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. It may be located locally or remotely accessible over a network. Note that in one embodiment, backup application server 120 and backup storage system 127 are integrated into one single system.

Metadata enabling the reconstruction of a backup disk/restore point can be stored, maintained and organized in the backup server 120. As a result, segments of data files (e.g. the backup disk/restore point) are stored (e.g., in a deduplicated manner), either within each of across the backup VM disk files 128.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the backup storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, the backup storage system as shown in FIG. 1 may be used as a tier of storage in a storage hierarchy that includes other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, backup engine 121 is configured to backup data (or deduplicated data) from host(s) 130 and to store the data in one or more of Backup VM disk files 128 of the back up storage system 127.

Backup storage system 127 may include any type of server or cluster of servers. For example, storage system 127 may be a storage server used for any of various different purposes, such as to provide multiple users with access to shared data and/or to back up mission critical data. Storage system 127 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, or essentially any other type of data storage device. Storage system 127 may have a distributed architecture, or all of its components may be integrated into a single unit. Storage system 127 may be implemented as part of a storage system available from EMC® Corporation of Hopkinton, Mass.

Storage system 127 contains a backup logic processor that manages backup and restore processes within the storage system. Storage system 127 also contains VM disk files 128 that contain content files of the VMs. Note that a storage system of a client may also be called the primary storage of the client to distinguish the storage from backup storage systems.

A virtual machine represents a completely isolated operating environment with a dedicated set of virtual resources associated with it. A virtual machine may be installed or launched as a guest operating system (OS) hosted by a host OS or a hypervisor. Typically, a host OS or hypervisor represents a virtual machine monitor (VMM) for managing the hosted virtual machines. A virtual machine can be any type of virtual machines, such as, for example, hardware emulation, full virtualization, para-virtualization, and operating system-level virtualization virtual machines. Different virtual machines hosted by a server may have the same or different privilege levels for accessing different resources. Here VMM 136 manages VMs 134.

In one embodiment, backup engine 121 collects attributes associated with the VM being backed up (e.g. CPU, memory, disk configuration) and stores the VM attributes in backup catalog 114. The attributes are subsequently used to provision a new VM to be the target of restoration, e.g. a target VM.

In one embodiment, the backup server 120 has a logic processor 126 that determines whether to connect with a client/host 130 based on whether communication is lost with the CMS 110. The logic processor can determine whether to take a snapshot of a target VM through a host request or through the CMS, based on determining whether a snapshot was previously requested prior for the same backup prior to the communication loss and whether the backup of the disk to the backup storage system was in-progress during the backup when the communication was lost (e.g. the storage process was interrupted). Such logic is shown, in one embodiment, in FIG. 3.

Figure 2:
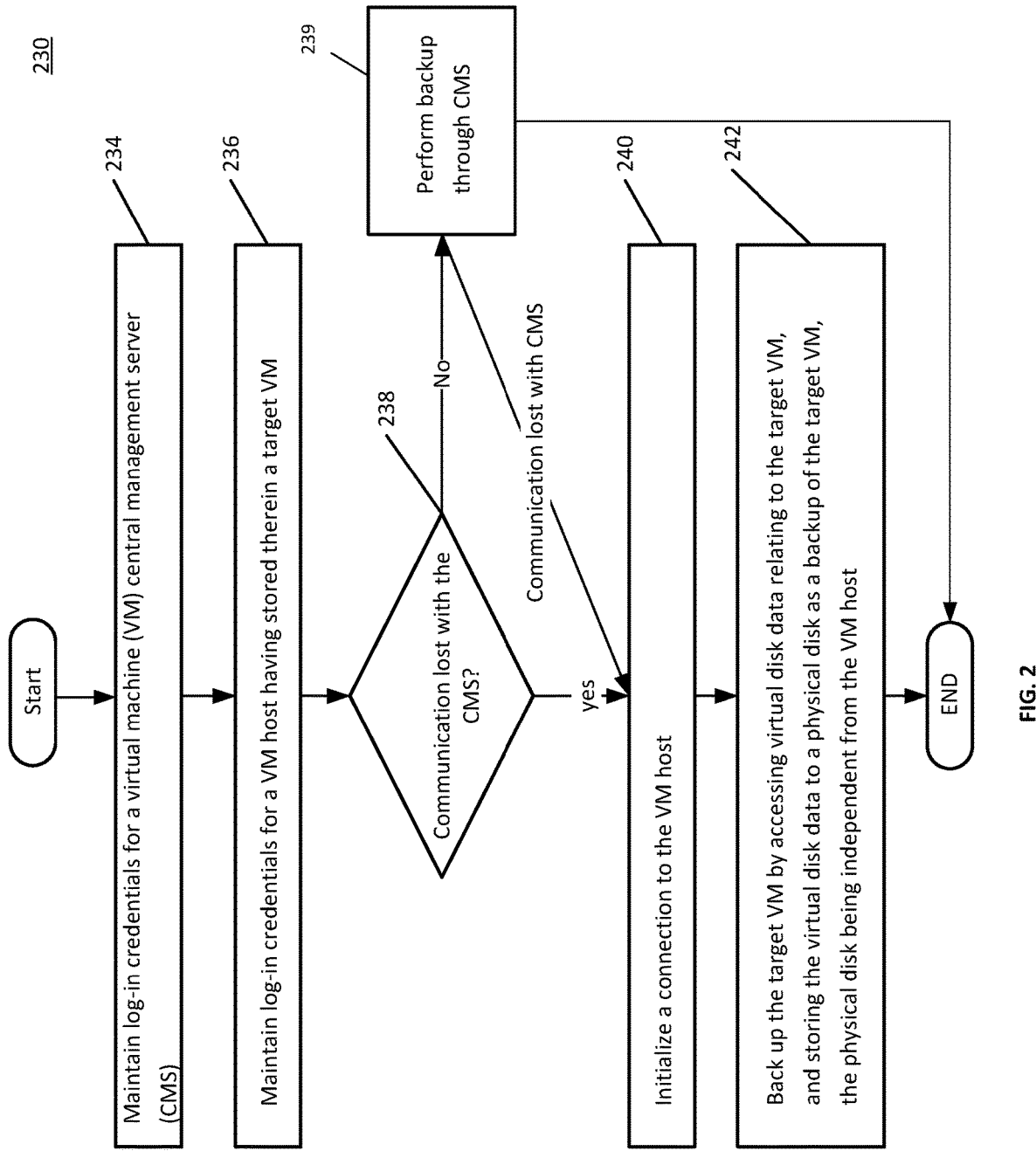
FIG. 2 shows a flow diagram of process and algorithm to perform backup according to one embodiment.

Referring now to FIG. 2, in one embodiment, a process or method 230 for backup of virtual machines is performed by a computing device (for example, a backup application server) as illustrated and described by the following blocks. Block 234 maintains log-in credentials for a virtual machine central management server. Block 236 maintains log-in credentials for a VM host having stored therein a target VM. Block 238 determines whether a communication is lost with the CMS.

If communication is not lost, then block 239 performs a backup through the CMS. The backup sequence can be performed, for example, by requesting, through a first API or protocol, that a snapshot is taken of the target VM. The CMS can send such a command to a host, where a hypervisor can generate a snapshot. The backup server can access one or more data disks of the snapshot, including file data, configuration data, and power state of the target VM. The backup server can then store the data disks onto backup disks of the backup storage system. In one aspect, it is assumed that communication already exists between the computing device and the CMS. For example, the communication could have been initiated by connecting to the CMS with CMS log-in credentials maintained by the computing device. If, during the backup sequence through the CMS, communication is lost, the process will jump to block 240.

If communication is lost, then block 240 initializes a connection to the VM host directly. The connection can be made with the host, using the host log-in credentials.

Block 242, performs backup of the target VM by accessing virtual disk data relating to the target VM. The computing device can then store the virtual disk data to a physical disk as a backup of the target VM, the physical disk being independent from the VM host. In the case where the backup was already initiated through the CMS, then the backup will continue through the host, as described in greater detail herein.

Figure 3:
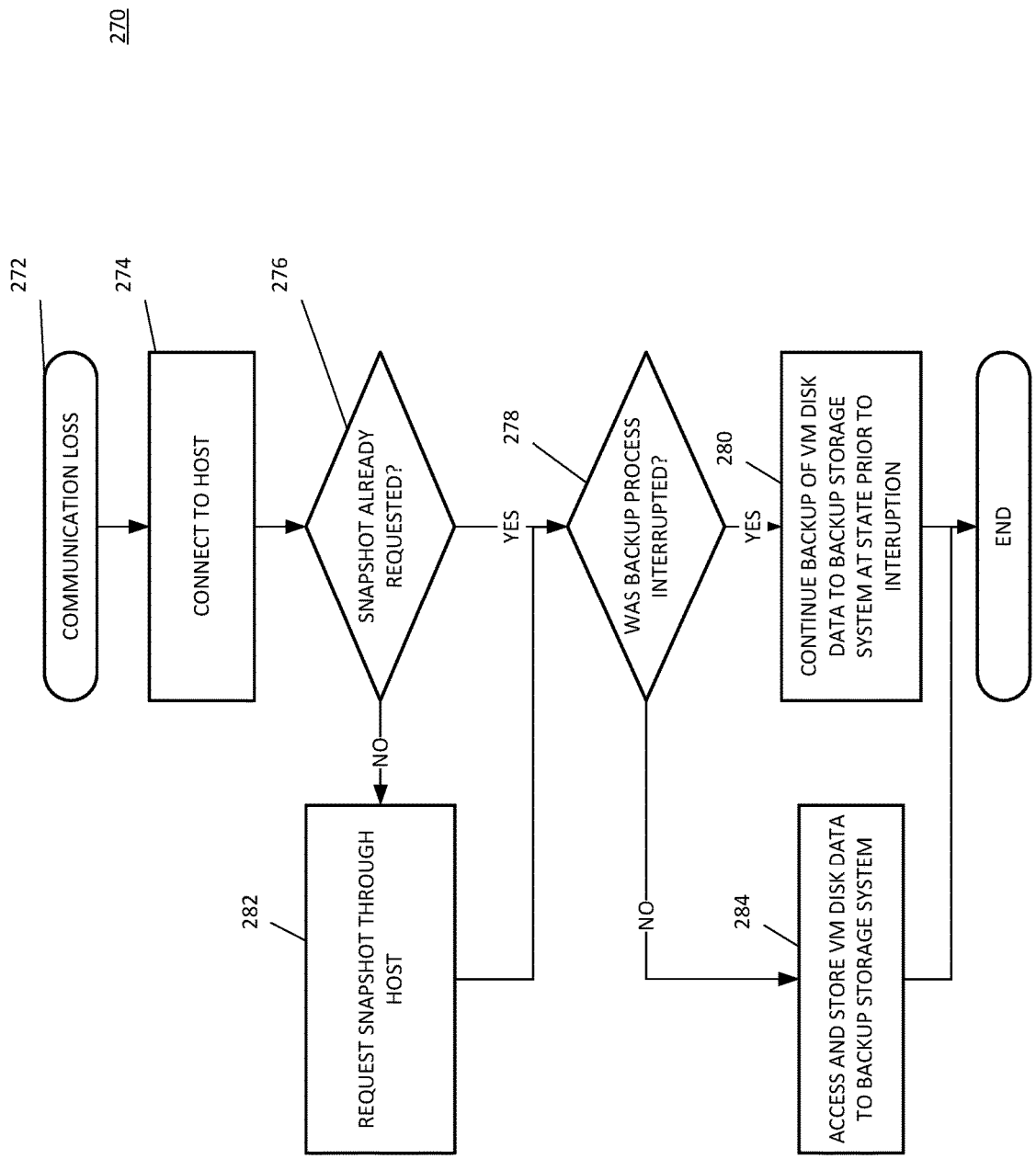
FIG. 3 shows a flow diagram of process and algorithm to perform backup according to one embodiment.

In one embodiment, a process or method 270 shown in FIG. 3 manages the backup logic of VMs in the case of a lost connection to a CMS. The process or method can be performed with a computing device. The method or process makes decisions based on determining whether a snapshot was requested prior to connection loss and/or whether a backup was interrupted during the communication loss. In block 272, communication is lost with the CMS. Block 274 connects to a host. This can be done using host credentials, maintained by the computing device. Block 276 determines whether a snapshot was previously requested for the same backup of the target VM, prior to the loss of communication.

If a snapshot was not previously requested for the same backup, then block 282 requests a snapshot through the host. This can be done, through a first API or protocol that is used to communicate commands and requests within the virtual environment, for example, VMware or vSphere APIs and SDKs.

If a snapshot was previously requested, block 278 determines whether the backup process, for example, the transfer of disk data of the target VM into one or more backup disks, was interrupted. For example, the device can set a flag or log an error if a communication loss with the CMS happens while the disk data of the VM is transferring or being stored in the disks of the backup storage solution, and record locations in memory of the disk data and that backup disks that were backed up prior to the communication loss.

If the backup process was interrupted, then block 280 can continue the backup of the VM disk data to the disks of the backup storage solution at or near the memory positions the previous backup was interrupted, thereby taking advantage of the previously transferred data and rather than to perform the same labor of storing the disk data onto a different disk, which would take additional time and disk space.

If the backup process was not interrupted, meaning that a communication loss did not occur during a previous backup attempt, block 284 can access VM disk data from the host, which was generated by the snapshot, and store it to the disks on the backup storage system.

Advantageously, the process above can be performed automatically, thereby providing a seamless backup solution that can maintain backups even during loss of communication with a CMS. This provides increased robustness and assurance to the customer that the RPO and RTO are met.

Each mounted backup disk can correspond to a requested restore point of the target VM. Alternatively, the requested restore points can be mapped to the backup disks. In one embodiment, instead of backup disks, the storage device can use a single backup disk for multiple restore points.

Figure 4:
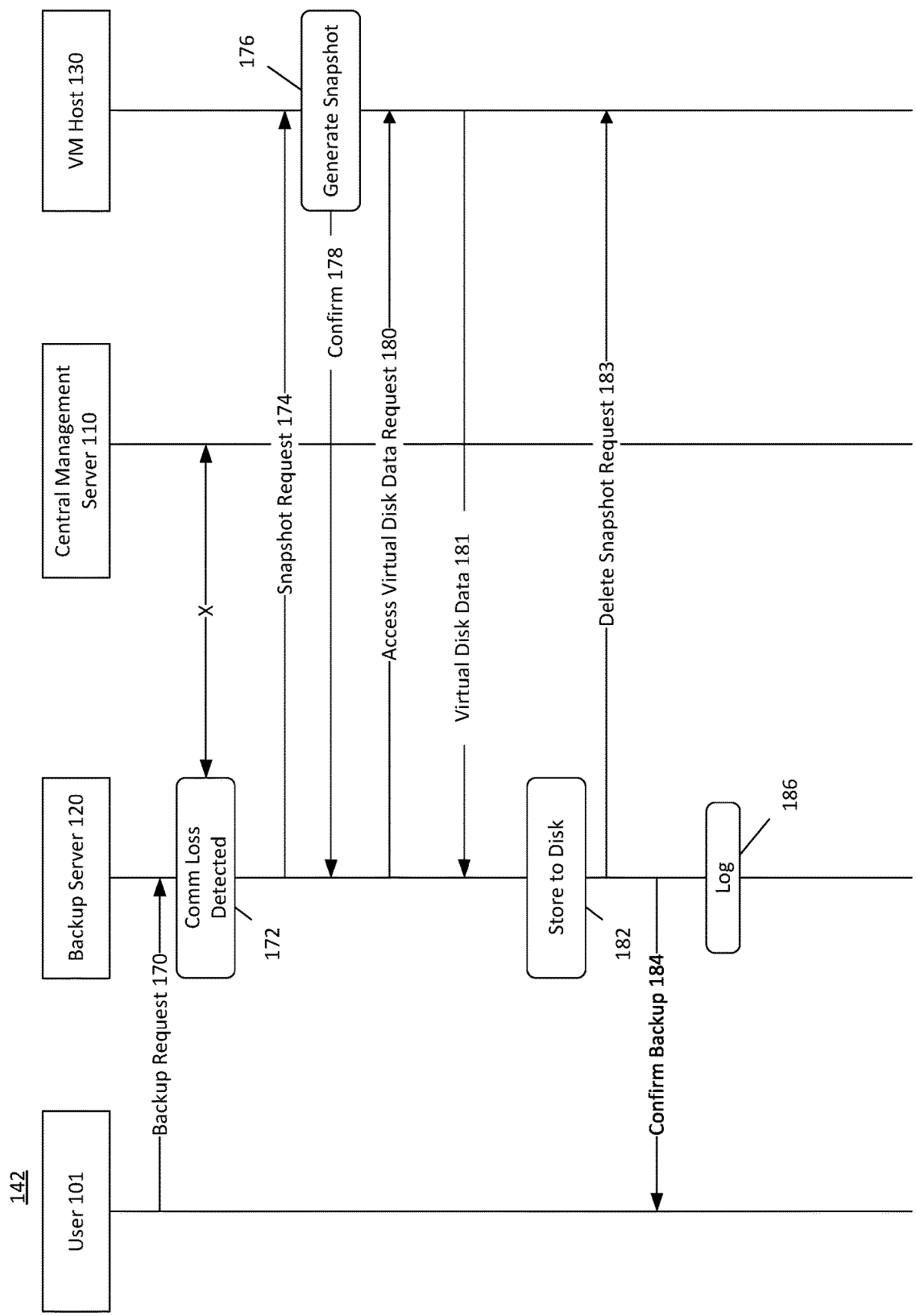
FIGS. 4-6 show sequence diagrams illustrating processes to perform backups under communication loss scenarios.

Referring now to FIG. 4, a sequence diagram is shown for a method or process 142 for performing a backup when communication is lost between a backup server and a CMS prior to starting a backup sequence. A user, through a user machine 101, can send a backup request 170 to the backup server 120. Alternatively or additionally, backup requests can be scheduled events in the backup server, not requiring a request from a user. The backup server can detect 172 a communication loss by a monitoring a heartbeat or periodic command-response from the CMS, or through a receiving a message or exception built into a communication layer, or other equivalent technique.

Based on the detected communication loss, the backup server can connect to the VM host 130 with host log-in credentials managed on the backup server, and send a snapshot request 174 to the host that specifies a target VM to take a snapshot of. The host can generate a snapshot 176 of the target VM, which includes generating disk data that can include file data, application data, configuration data, power state, and other data that allows the VM to be recreated. A VM host 130 can send a confirmation 178 to the backup server 120 that can describe, for example, that the snapshot is complete or that the request has been received. The backup server can connect to the VM host using host credentials managed on the backup server and send a snapshot request 174 to the VM host. A snapshot request can be generated using a first protocol or API, which the CMS and host recognize to perform VM management/maintenance tasks such as taking a snapshot of a VM. The VM host can generate a snapshot 176 of a target VM that was specified in the snapshot request, and send a confirmation 178 or acknowledgement that the snapshot request was received or that the snapshot was successful.

The backup server can send an access disk data request 180 to the VM host 130. This can be performed using a disk specific protocol or API or library that the host is responsive to. The VH host 130 can transfer or store disk data 181 of the target VM to a backup server 120. It should be understood that the backup server 120 can have the disk data sent directly from the VM host to a backup storage system 110 to be stored on disks 128, as shown in FIG. 1. In this manner, the backup server stores 182 the disk data of the target VM to the backup disks on the backup storage system.

The backup server can send 183 a delete snapshot request to the VM host to free disk space or memory on the VM host. The backup server can confirm 184 with a user that the VM backup is successful. The backup server can log 186 the backup status and data relating to the backup such as snapshot and disk requests and communication loss data.

Figure 5:
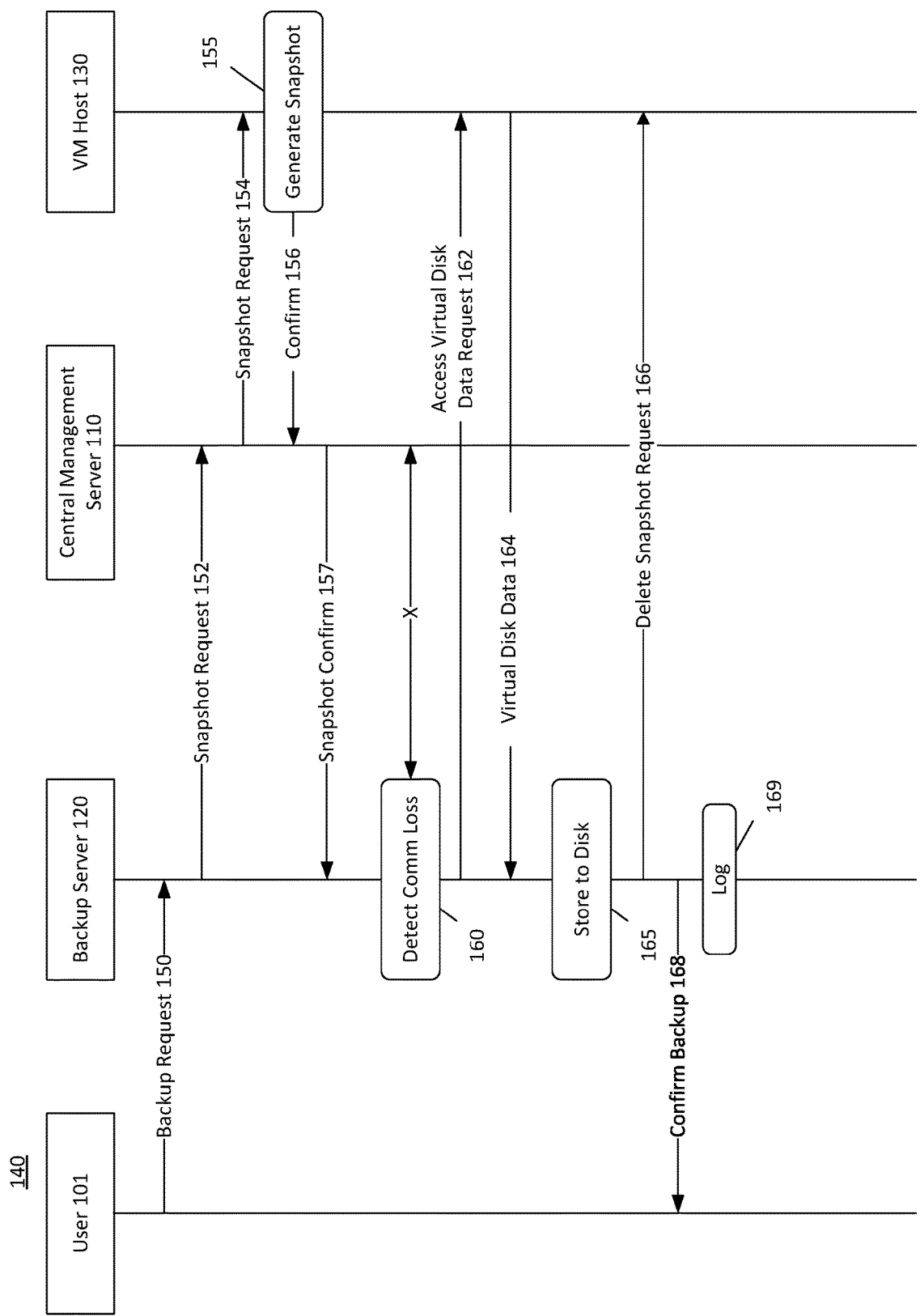

Referring now to FIG. 5, a sequence diagram is shown for a method or process 140 for performing backup when communication is lost after a snapshot is requested by the backup server through the CMS. A user, through a user machine 101, can send a backup request 150 to the backup server 120. Alternatively or additionally, backup requests can be scheduled events in the backup server, not requiring a request from a user.

The backup server can send a snapshot request 152 to the CMS 110. The CMS can then relay a snapshot request 154 to the VM Host 130. The VM Host can generate a snapshot 155 corresponding to a target VM that was specified by the backup server and/or the CMS. Optionally, a confirmation 156 and 157 can be relayed from the VM host to the CMS to the backup server, which indicates that a snapshot was performed. The backup server can detect 160 a communication loss with the CMS. Based on the communication loss, a backup server logic processor on the backup server can determine that a snapshot was previously generated for same backup of the target VM and send an access disk data request 162 through a VM Host connection. In this manner, the system can beneficially utilize the disk data generated from the previously generated snapshot, rather than perform double work. The connection and request to the VM Host can be established via host log-in credentials managed on the backup server. The host can store the disk data 164 to the backup server 120. It should be understood that the backup server 120 can have the disk data sent directly from the VM host to a backup storage system 110 to be stored on disks 128, as shown in FIG. 1. In this manner, the backup server stores 165 the disk data of the target VM to the backup disks on the backup storage system.

The backup server can send 166 a delete snapshot request to the VM host to free disk space or memory on the VM host. The backup server can confirm 168 with a user that the VM backup is successful. The backup server can log 169 the backup status and data relating to the backup such as snapshot and disk requests and communication loss data.

Figure 6:
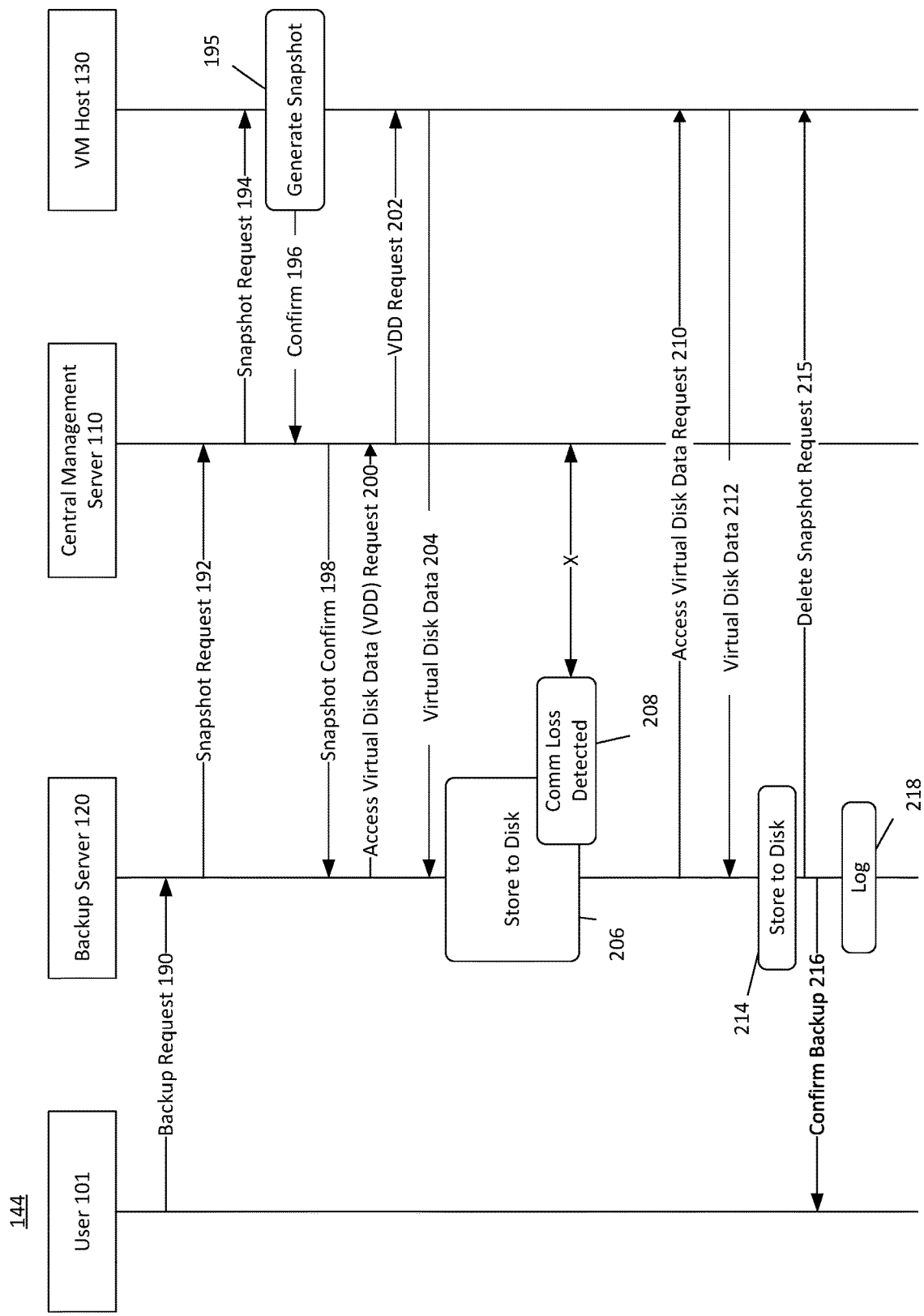

Referring now to FIG. 6, a sequence diagram is shown for a method or process 144 for performing backup when communication is lost during storage of disk data of a virtual machine. A user, through a user machine 101, can send a backup request 190 to the backup server 120. Alternatively or additionally, backup requests can be scheduled events in the backup server, not requiring a request from a user.

The backup server can send a snapshot request 192 to the CMS 110. The CMS can then relay a snapshot request 194 to the VM Host 130. The VM Host can generate a snapshot 195 corresponding to a target VM that was specified by the backup server and/or the CMS. Optionally, a confirmation 196 and 198 can be relayed from the VM host to the CMS to the backup server, which indicates that a snapshot was performed or that the request was received.

The backup server can send an access disk data request 200 through a CMS connection. In this manner, the system can beneficially utilize the disk data generated from the snapshot, to store in a backup disk. The connection and request to the CMS can be established via CMS log-in credentials managed on the backup server. The CMS can relay the disk data request 202 to the VM host. The host can send the disk data 204 to the backup server 120. It should be understood that the backup server 120 can have the disk data sent directly from the VM host to a backup storage system 110 to be stored on disks 128, as shown in FIG. 1. In this manner, the backup server stores 206 the disk data of the target VM to the backup disks on the backup storage system.

During the transfer of disk data to the backup disks, the backup sever detects 208 a communication loss with the CMS. Based on the communication loss, a backup server logic processor on the backup server can determine that a snapshot was previously generated for same backup of the target VM, and that the disk storing process 206 was interrupted. The backup server can connect to the VM host 130 with host log-in credentials and send an access disk data request 210. The VM host can store the disk data 212 to the backup server 120 for backup storage. It should be understood that the backup server 120 can have the disk data sent directly from the VM host to a backup storage system 110 to be stored on disks 128, as shown in FIG. 1. In this manner, the backup server stores 214 the disk data of the target VM to the backup disks on the backup storage system. As described herein, the storage process of 214 can continue where the previous store process 206 left off, using the same storage disks at the memory locations near where the previous store process was interrupted.

The backup server can send a delete snapshot request 215 to the VM host to free disk space or memory on the VM host. The backup server can send a confirmation 216 to a user to indicate that the VM backup is successful. The backup server can log 218 the backup status and data relating to the backup such as snapshot and disk requests and communication loss data.

Thus, the backup server can automatically and seamlessly mitigate the problem of connection loss by continuing the backup directly with the host, and without losing any of the previous work performed (e.g., the disk data previously transferred to the backup disks prior to the interruption).

In one aspect, FIGS. 7a-7c, show the behavior of a computing device, for example, a backup server, in different communication loss scenarios. A scenario 310 is shown in FIG. 7a, where a communication loss between a computing device and a CMS occurs prior to snapshot generation. A scenario 320 is shown in FIG. 7b, where a communication loss occurs after a snapshot is requested, but before a disk access and storage is initiated. A scenario 330 is shown in FIG. 7c, where a communication loss occurs after a backup is initialized and disk data storage of a VM has begun, thereby interrupting the disk storage sequence.

In all scenarios, a log-in to CMS 302 is performed to establish a backup. At different points in time, a communication loss occurs between the CMS and the device. When the communication loss occurs, a connection switch to Host 304 will be performed.

The device can take snapshot via CMS Host connection 326, if the communication with the CMS still exists. If, however, the communication loss happened prior to the snapshot, then the device will take snapshot via CMS host connection 306. In either case, a snapshot is becomes generated for a target VM, for the purpose of using the snapshot for backup.

The device can initialize disk access via CMS connection 332 and backup disk data via CMS connection 334, if the communication with the CMS still exists. If, however, the communication loss happened prior to the disk access, then the device can initialize disk access via host connection 308 and backup disk data via host connection 310. The device can store disk data generated by the snapshot of the target VM into a backup storage system.

A communication loss can occur during the backup of disk files, as shown FIG. 7c. In this case, the device can continue backup disk via host connection 336. For example, the backup can continue at a memory/disk location of the disk data of the snapshot and on the backup storage system disks where the backup was interrupted at. In this manner, the system can leverage the backup work already performed prior to the interruption.

Figure 8:
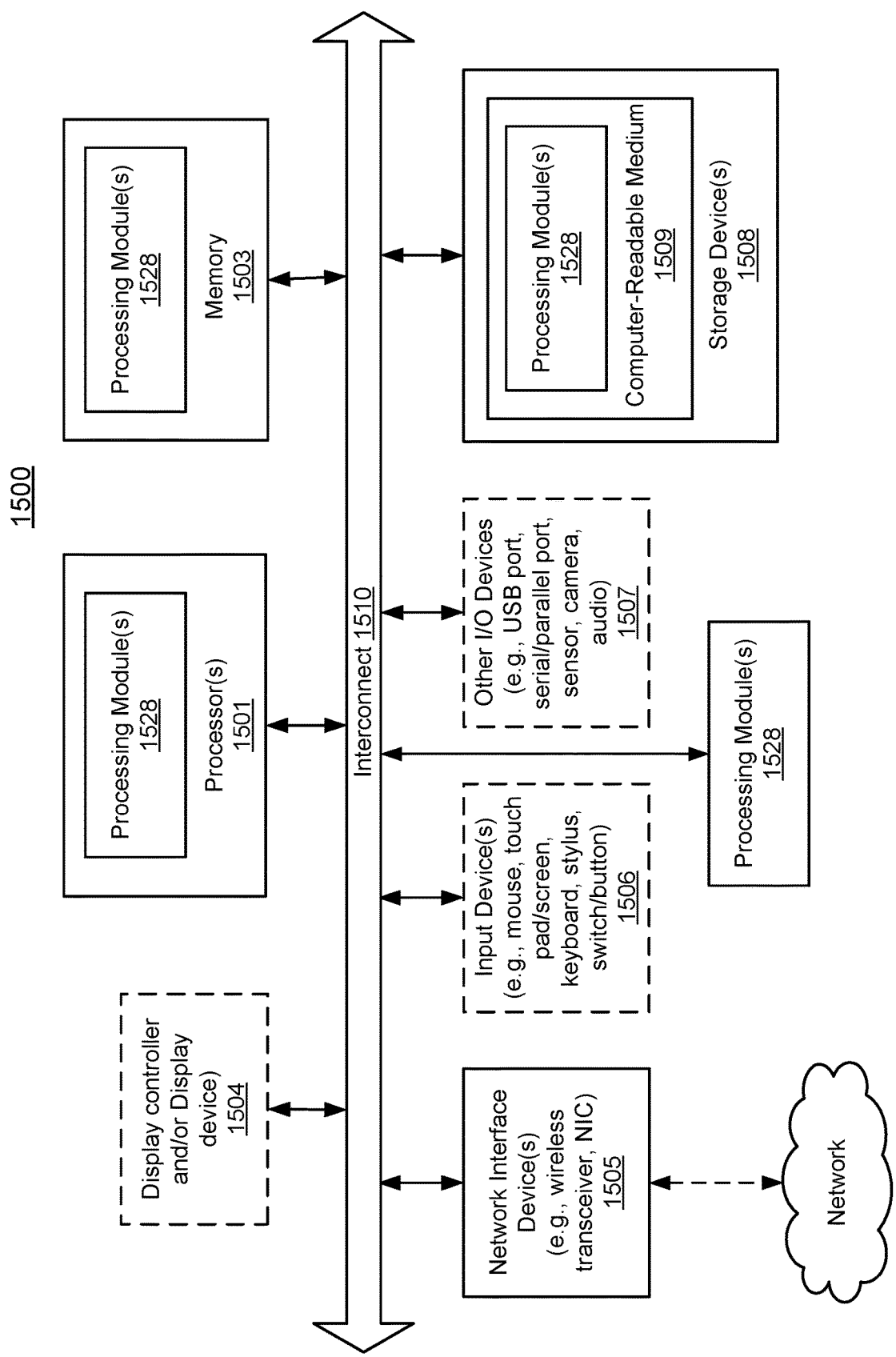
FIG. 8 is a block diagram illustrating a data processing system according to one embodiment.

FIG. 8 is a block diagram illustrating an example of a data processing system which may be used with one embodiment of the invention. For example, system 1500 may represent any of data processing systems such as client/host 130, CMS 110, backup storage system 127, and backup server 120, for performing any of the processes or methods described in the present disclosure. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows operating system from Microsoft®, Mac OS®/iOS® from Apple, Android® from Google®, Linux®, Unix®, or other real-time or embedded operating systems such as VxWorks.

System 1500 may further include 10 devices such as devices 1505-1508, including network interface device(s) 1505, optional input device(s) 1506, and other optional 10 device(s) 1507. Network interface device 1505 may include a wireless transceiver and/or a network interface card (NIC).

The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, snapshot generation module 203, snapshot analyze module 205, a deduplication logic or a backup engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that includes hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed by a backup server comprising:
    maintaining log-in credentials for a virtual machine (VM) central management server (CMS), the CMS providing an interface to manage one or more VM hosts;
    maintaining log-in credentials for a VM host having stored therein a target VM;
    if communication is lost with the CMS,
        initializing a connection to the VM host;
        backing up the target VM by accessing virtual disk data relating to the target VM, and storing the virtual disk data to a physical disk as a backup of the target VM, the physical disk being independent from the VM host.

2. The method according to claim 1, wherein:
    if the communication is lost during a previous attempt to back up the target VM, the accessing and storing of the virtual disk data will continue where the previous backup was interrupted.

3. The method according to claim 1, wherein:
    if a backup snapshot of the target VM was requested through the CMS before the communication loss, the virtual disk data that is accessed and stored corresponds to a snapshot of the target VM that is generated by the VM host in response to the backup snapshot request.

4. The method according to claim 1, wherein:
    if no backup snapshot was requested prior to the communication loss, a backup snapshot of the target VM is requested through the VM host.

5. The method according to claim 1, wherein the credentials to login to the CMS are different from the credentials to login to the VM host.

6. The method according to claim 1, wherein the backup server, the CMS, and the VM host are connected over a network.

7. The method according to claim 1, wherein the backup is performed over a network using a first protocol or first application programming interface (API) and a snapshot request is performed over the network using a second protocol or second API or library.

8. The method according to claim 1, wherein the backup server automatically decides whether to initialize the connection to the VM host without a command or input from a user.

9. The method according to claim 1, further comprising: recording backing up of the target VM and the connection loss in a log.

10. The method according to claim 1, wherein the method is performed in response to a request from a user to back up the target VM.

11. A non-transitory machine-readable medium having instructions stored therein, which when executed by a processor, cause the processor to perform operations, the operations comprising:
    maintaining log-in credentials for a virtual machine (VM) central management server (CMS), the CMS providing an interface to manage one or more VM hosts;
    maintaining log-in credentials for a VM host having stored therein a target VM;
    if communication is lost with the CMS,
        initializing a connection to the VM host;
        backing up the target VM by accessing virtual disk data relating to the target VM, and storing the virtual disk data to a physical disk as a backup of the target VM, the physical disk being independent from the VM host.

12. The non-transitory machine-readable medium according to claim 11, wherein:
    if the communication is lost during a previous attempt to back up the target VM, the accessing and storing of the virtual disk data will continue where the previous backup was interrupted.

13. The non-transitory machine-readable medium according to claim 11, wherein:
    if a backup snapshot of the target VM was requested through the CMS before the communication loss, the virtual disk data that is accessed and stored corresponds to a snapshot of the target VM that is generated by the VM host in response to the backup snapshot request.

14. The non-transitory machine-readable medium according to claim 11, wherein:
    if no backup snapshot was requested prior to the communication loss, a backup snapshot of the target VM is requested through the VM host.

15. The non-transitory machine-readable medium according to claim 11, wherein the credentials to login to the CMS are different from the credentials to login to the VM host.

16. The non-transitory machine-readable medium according to claim 11, wherein the backup server, the CMS, and the VM host are connected over a network.

17. The non-transitory machine-readable medium according to claim 11, wherein the backup is performed over a network using a first protocol or first application programming interface (API) and a snapshot request is performed over the network using a second protocol or second API or library.

18. The non-transitory machine-readable medium according to claim 11, wherein the backup server automatically decides whether to initialize the connection to the VM host without a command or input from a user.

19. The non-transitory machine-readable medium according to claim 11, further comprising: recording backing up of the target VM and the connection loss in a log.

20. A system comprising:
- a processing system having at least one hardware processor, the processing system coupled to a memory programmed with executable instructions that, when executed by the processing system, perform operations comprising:
- maintaining log-in credentials for a virtual machine (VM) central management server (CMS), the CMS providing an interface to manage one or more VM hosts;
- maintaining log-in credentials for a VM host having stored therein a target VM;
- if communication is lost with the CMS,
    - initializing a connection to the VM host;
    - backing up the target VM by accessing virtual disk data relating to the target VM, and storing the virtual disk data to a physical disk as a backup of the target VM, the physical disk being independent from the VM host.

\* \* \* \* \*